United States Patent Office

2,944,944
PYRROLIDONE PURIFICATION

Temple Clayton, White Bear Lake, Minn., assignor to Minnesota Mining and Manufacturing Company, St. Paul, Minn., a corporation of Delaware No Drawing. Filed Mar. 3, 1958, Ser. No. 718,472

3 Claims. (Cl. 202—52)

This invention relates to the purification of pyrrolidone and particularly to a one-step process therefor.

It has heretofore been known that commercially available pyrrolidone contains various impurities such as water, ammonia, basic materials, butyrolactone and the like contaminants. It is known that the removal of these substances is desirable to produce pyrrolidone polymerizable to a good grade of polypyrrolidone, and several methods have been devised in an attempt to remove such impurities. For example, the removal of water by distillation of a forerun of pyrrolidone prior to polymerization is described in U.S. Patent 2,638,463; the formation of a crystalline hydrate and subsequent drying is described in U.S. Patent 2,802,777 and a combination of treatment with a carboxylic anhydride followed by distillation from base is described in U.S. Patent 2,806,856.

Each of these heretofore known procedures requires a multiplicity of operations involving considerable labor and sequential removal of basic impurities and water or the incomplete removal of one of these contaminants. These processes further are not always directly applicable to commercial pyrrolidone, which may contain considerable discoloration and contain substantial amounts of impurities.

It is an object of this invention to provide a one-step process for the purification of pyrrolidone. A further object is to provide pyrrolidone which is free from basic materials and water. Other objects will become apparent hereinafter.

It has been found that the above and other objects of this invention are accomplished by distilling pyrrolidone under reduced pressure from phosphorus pentoxide. It is very surprising to find that such treatment does not result in extensive damage to the pyrrolidone as would have been predicted on the basis of previous experience with phosphorus pentoxide. It is, for example, well known that phosphorus pentoxide can only be used for drying substances such as hydrocarbons and halogenated hydrocarbons and that it will react with substances containing oxygen or nitrogen. It is also known that, for example, acetamide is converted to acetonitrile by distillation from phosphorus pentoxide. It is further known that phosphoric acid forms complexes with many lower molecular weight compounds. In view of these prior observations it is most remarkable that a simple distillation under reduced pressure of pyrrolidone in the presence of phosphorus pentoxide not only removes basic materials and water but does so to produce pyrrolidone which is readily polymerizable. The product pyrrolidone is found to be somewhat less absorbent in the ultra-violet than pyrrolidone distilled from potassium hydroxide, indicating that less unsaturation is present after treatment, and that no substantial deleterious action leading to unsaturated products has occurred.

There are further advantages to the process of this invention. It is known that polymerization of pyrrolidone occurs in the presence of a base and that butyrolactone is an activator for the reaction. Hence it is possible in distilling from a base to reach conditions under which butyrolactone present as an impurity may bring about extensive polymerization of the pot residues with resultant difficulties in removal and handling thereof. If water is added to such residues, additional monomer may be lost, for when basic residues are in contact with water there is also considerable tendency for hydrolysis of the pyrrolidone ring. On the other hand, the acidic residues from the process of the present invention are completely unpolymerized and are suitable for processing to recover residual pyrrolidone if this is desirable, for example, by diluting with water and isolating the pyrrolidone hydrate.

A still further advantage of the present invention is in the uniform, substantial neutrality of the product pyrrolidone. It is found that when distilled from bases, pyrrolidone contains variable amounts of basic substances. Any such variations are detrimental to the subsequent polymerization of the pyrrolidone since they introduce an uncontrolled variable. It is found in the process of the present invention that a small forerun is slightly acidic, perhaps due to concentration of carbon dioxide, and the bulk of the distilled purified pyrrolidone is substantially neutral. There is therefore no problem associated with possible variability in results.

Broadly speaking, the process of the invention is carried out by adding to crude pyrrolidone an amount of phosphorus pentoxide in the range of about 0.2 to 20 parts per 100 parts of pyrrolidone. The resulting mixture is then distilled under reduced pressure. The pressure and corresponding temperature used are not important, but it is preferred that the distillation be conducted at pressures of the order of about 0.1 to 10 mm. of mercury, and at temperature ranging from about 60° to about 130° C. However, even at higher pressures and temperatures the pot residue remains unpolymerized and can be processed for recovery of pyrrolidone as hereinabove described.

The invention having been thus described in general terms, it is now more specifically illustrated to show the best mode contemplated for carrying out the invention without thereby being limited in scope. Herein, parts are by weight and inherent viscosities are determined by standard methods at a concentration of about 0.2 g. in 100 ml. of metacresol.

Example 1

A vessel is charged with 14 parts of phosphorus pentoxide and 700 part of yellowish commercial pyrrolidone containing about 1 percent of water and having a faint amine-like mousy odor. The phosphorus pentoxide dissolves on agitation and the vessel is arranged for vacuum distillation through a short Vigreux column. The pyrrolidone is distilled collecting a small forerun to 102° C. at about 1.4 mm. Hg (about 6%) and the main cut (about 86%) is collected at about 1.45 mm. Hg and 102° to 104° C. The yellowish color of the original pyrrolidone is somewhat darkened in the presence of the phosphorus pentoxide, but does not noticeably increase further other than that it is concentrated during the distillation. The residue remaining after the distillation is a brownish yellow oily material which is miscible with water. When the aqueous solution of the residue is made alkaline, the amine-like, mousy odor noticed in the commercial pyrrolidone is quite strong clearly showing removal of this impurity.

The neutrality of pyrrolidone is conveniently determined by determining the pH of 1 percent solutions in distilled water. The following results are obtained on the above fractions and pyrrolidone purified by other methods.

|                                            | pH of 1% aqueous solution |
|--------------------------------------------|---------------------------|
| Forerun of process of invention            | 4–6                       |
| Main cut of process of invention           | 6.5–6.7                   |
| Commercial pyrrolidone                     | 8–11                      |
| Purified by process of U.S. 2,802,777      | 9–11                      |
| Purified by process of U.S. 2,806,856 using propionic anhydride | 7–9   |

It is thus evident that the product pyrrolidone of this invention is substantially neutral and is superior in that respect to products of previous processes obtained by a multiplicity of operations.

The product pyrrolidone is adequately pure for polymerization by the procedures described in U.S. Patents 2,739,959 and 2,809,958, for example, by dissolving 0.8 percent of sodium therein and then adding about 0.7 part of an activator as acetyl pyrrolidone. Alternatively pure sodium or potassium pyrrolidone may be prepared and employed as the alkaline polymerization catalyst together with an activator. The following example shows the suitability of the purified pyrrolidone of this invention in a process according to U.S. Patent 2,809,958 employing potassium hydroxide to generate the catalyst.

Example 2

A vessel fitted for vacuum distillation, addition and having a thermometer to measure the temperature of the contents is charged with 100 parts of the purified main cut pyrrolidone of Example 1 and 215 parts of xylene (Merck Reagent, distilling 137° to 140° C.). Vacuum and heat are applied and distillation of xylene commences at about 45° C. at about 18 mm. Hg pressure. A solution of 2.2 parts of potassium hydroxide in 3.0 parts of water is then added and the added water and that formed by reaction to form potassium pyrrolidone are codistilled with the xylene. The temperature of the contents of the vessel rises gradually as the xylene distils and when it reaches 90° C. (at the same pressure) all the water and most of the xylene are in the distillate. The contents of the flask are cooled and transferred to a closable container (such as a bottle) and 0.73 part of acetyl pyrrolidone is added and mixed in. Polymerization commences immediately with some evolution of heat and is permitted to proceed under ambient conditions for about 65 hours. The resultant block of polymer is removed from the container (suitably by breaking the bottle) and after comminution is washed with 400 part portions of water, 0.5% aqueous acetic acid and with water until substantially neutral. The very nearly white polymer has all the desirable properties of polypyrrolidone. It has a melting point of about 265° C. and inherent viscosity of 2.75 which is unaffected by treatment at room temperature for 1 hour with either 1N hydrochloric acid or 1N potassium hydroxide. When heated at 250° C. under high vacuum (about $10^{-2}$ mm. Hg) for 0.5 hour the loss in weight is about 6 percent. When pressed between heated platens at about 250° C. it forms a clear, transparent flexible film.

It is evident that the amount of phosphorus pentoxide employed can vary over wide limits from an amount barely sufficient to react with impurities to a large excess, however, it is commonly found convenient that the amount be from about 1.5 to about 10 times the weight of water present. A preferred range is from about 3 to about 8 times the weight of water present. Thus, in the purification of a crude commercial pyrrolidone containing about 1 percent of water, about 1½ to 10 percent of phosphorus pentoxide is added. This invention contemplates that a lesser amount, for example, 0.5 percent may be employed when, as in Example 2, a further removal of water is to be effected as a part of the polymerization procedure. In such a case the phosphorus pentoxide is particularly effective in the removal of the basic impurities. If desired a partial removal of water may precede the distillation from phosphorus pentoxide in which case the amount of phosphorus pentoxide used may be in excess of that necessary to react with the residual water.

What is claimed is:

1. The process for the purification of pyrrolidone, which comprises admixing phosphorus pentoxide with crude pyrrolidone, subjecting the mixture to distillation under reduced pressure, and collecting substantially neutral purified pyrrolidone in the distillate.

2. The process for the purification of pyrrolidone which comprises admixing about 0.2 to 20 parts by weight of phosphorus pentoxide with 100 parts by weight of crude pyrrolidone, subjecting the mixture to distillation under reduced pressure, and collecting substantially neutral purified pyrrolidone in the distillate.

3. The process for the purification of pyrrolidone which comprises admixing with crude pyrrolidone an amount of phosphorus pentoxide in excess of that which would be sufficient to react with the water contained in said pyrrolidone, and subjecting the mixture to distillation under reduced pressure.

References Cited in the file of this patent
UNITED STATES PATENTS

| 2,745,834 | Mertz    | May 15, 1956  |
| 2,802,777 | Lohr     | Aug. 13, 1957 |
| 2,806,856 | Robinson | Sept. 17, 1957 |